United States Patent
Tojo

(10) Patent No.: US 9,859,730 B2
(45) Date of Patent: Jan. 2, 2018

(54) MOBILE TERMINAL CHARGER AND VEHICLE EQUIPPED WITH SAME

(71) Applicant: Panasonic Intellectual Property Management Co., Ltd., Osaka (JP)

(72) Inventor: Yuki Tojo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 14/950,974

(22) Filed: Nov. 24, 2015

(65) Prior Publication Data

US 2016/0079782 A1 Mar. 17, 2016

Related U.S. Application Data

(63) Continuation of application No. PCT/JP2014/003125, filed on Jun. 12, 2014.

(30) Foreign Application Priority Data

Jun. 13, 2013 (JP) ................................ 2013-124365

(51) Int. Cl.
*H02J 7/00* (2006.01)
*H02J 5/00* (2016.01)
*H02J 7/02* (2016.01)

(52) U.S. Cl.
CPC ............ *H02J 7/0044* (2013.01); *H02J 5/005* (2013.01); *H02J 7/025* (2013.01)

(58) Field of Classification Search
CPC ........ H02J 7/025; H01F 38/14; Y02T 90/122; B60L 11/182; Y02E 60/12

USPC .......................................................... 320/108
See application file for complete search history.

(56) References Cited

U.S. PATENT DOCUMENTS

| | | | | |
|---|---|---|---|---|
| 5,573,090 A | * | 11/1996 | Ross | ....................... B60L 5/005 180/2.1 |
| 8,664,914 B2 | | 3/2014 | Toya et al. | |
| 8,786,252 B2 | | 7/2014 | Toya et al. | |
| 2009/0079270 A1 | * | 3/2009 | Jin | ......................... H02J 7/025 307/104 |
| 2009/0153098 A1 | | 6/2009 | Toya et al. | |

(Continued)

FOREIGN PATENT DOCUMENTS

| | | |
|---|---|---|
| JP | 2009-247194 | 10/2009 |
| WO | 2012/081519 | 6/2012 |
| WO | 2013/077276 | 5/2013 |

OTHER PUBLICATIONS

International Search Report of PCT application No. PCT/JP2014/003125 dated Jul. 15, 2014.

*Primary Examiner* — Arun Williams
(74) *Attorney, Agent, or Firm* — Wenderoth, Lind & Ponack, L.L.P.

(57) ABSTRACT

In control means (10), a position of a mobile terminal (15) on an upper surface of a mobile terminal installation plate (6) is detected a plurality of times by a position detection coil (14) used as detection means, and when a previous detected position and a subsequent (referred to as next) detected position are the same, a charging coil (8) is moved by motors (28), (33) used as driving means to a charging position opposed to the previous detected position or the next detected position detected by the position detection coil (14), and the charging is then started.

5 Claims, 17 Drawing Sheets

(56) References Cited

U.S. PATENT DOCUMENTS

| | | | |
|---|---|---|---|
| 2009/0278505 A1* | 11/2009 | Toya | H02J 7/025 |
| | | | 320/152 |
| 2012/0246374 A1* | 9/2012 | Fino | G06F 1/1632 |
| | | | 710/303 |
| 2012/0326659 A1* | 12/2012 | Shukuya | H02J 7/025 |
| | | | 320/108 |
| 2013/0009596 A1 | 1/2013 | Toya et al. | |
| 2014/0028253 A1 | 1/2014 | Toya et al. | |
| 2014/0070765 A1* | 3/2014 | Hasegawa | H01M 10/46 |
| | | | 320/108 |
| 2014/0103865 A1* | 4/2014 | Van Wiemeersch | H02J 17/00 |
| | | | 320/108 |
| 2014/0285144 A1 | 9/2014 | Toya et al. | |

* cited by examiner

MOBILE TERMINAL CHARGER AND VEHICLE EQUIPPED WITH SAME

TECHNICAL FIELD

The present invention relates to a mobile terminal charger to charge a mobile terminal such as a mobile phone and the like, and a vehicle equipped with the same.

BACKGROUND ART

Functions of a mobile terminal such as a mobile phone and the like have become extremely high, and along with this, power consumption has been increasing.

Accordingly, it has been demanded that charging is enabled in various places including a vehicle, and as a tendency in recent years, a mobile terminal that can perform so-called contactless charging without using a cable has been attracting attention.

As a mobile terminal charger that meets the above-described demand, the following has been proposed.

That is, the mobile terminal charger is formed so as to include a body case with a mobile terminal installation plate disposed in an upper surface of the body case, a charging coil provided movably in opposition to a lower surface side of the mobile terminal installation plate, driving means for moving the charging coil in opposition to the lower surface side of the mobile terminal installation plate, and control means connected to the driving means and the charging coil.

Moreover, in the mobile terminal installation plate, a plurality of detection coils that detect a position of a mobile terminal installed on an upper surface of the mobile terminal installation plate are provided (e.g., PTL 1).

CITATION LIST

Patent Literature

PTL 1: Unexamined Japanese Patent Publication No. 2009-247194

SUMMARY OF THE INVENTION

Technical Problem

In the above conventional example, when the mobile terminal is placed on the upper surface of the mobile terminal installation plate, the position of the placed mobile terminal is detected by the detection coils, the charging coil is moved to a detected location, and the charging is performed in this state, which enables efficient charging to be performed.

However, if the mobile terminal is moved from the state placed on the upper surface of the mobile terminal installation plate, or if the mobile terminal is moved in a position close to the upper surface of the mobile terminal installation plate, the efficient charging may be disabled to be performed.

That is, in the above-described cases, the detection coils detect, as a mobile terminal position, a location where the mobile terminal is first placed on the upper surface of the mobile terminal installation plate, or a location where the mobile terminal first approaches the upper surface of the mobile terminal installation plate, so that the charging coil is moved to the location.

However, actually, the mobile terminal thereafter moves to a different position on the upper surface of the mobile terminal installation plate, and in this state, the mobile terminal position and a charging coil position are out of alignment, which consequently disables the efficient charging to be performed.

Consequently, an object of the present invention is to enable efficient charging to be performed.

Solution to Problem

A mobile terminal charger according to one aspect of the present invention includes a body case with a mobile terminal installation plate disposed in an upper surface of the body case, and detection means that is provided in the mobile terminal installation plate, and detects a position of a mobile terminal installed on an upper surface of the mobile terminal installation plate. The mobile terminal charger includes a charging coil disposed movably and facing to a lower surface of the mobile terminal installation plate inside the body case, driving means for moving the charging coil facing to the lower surface side of the mobile terminal installation plate, and control means connected to the driving means and the charging coil. The control means causes the detection means to detect the position of the mobile terminal on the upper surface of the mobile terminal installation plate a plurality of times, and causes the driving means to move the charging coil to a charging position opposed to a previous detected position or a subsequent detected position detected by the detection means when the previous detected position and the subsequent detected position are the same, and then starts the charging. With the above configuration, the expected object is achieved.

According to the above configuration, the position of the mobile terminal on the upper surface of the mobile terminal installation plate is detected a plurality of times by the detection means, and the charging coil is moved by the driving means to the charging position opposed to the previous detected position or the subsequent detected position detected by the detection means when the previous detected position and the subsequent detected position are the same, and the charging is then started. Thus, the charging coil can be moved to the actual mobile terminal position, and as a result, efficient charging can be performed.

Advantageous Effect of Invention

As described above, the present invention enables the charging coil to be moved to the mobile terminal position more accurately.

Thus, the efficient charging can be performed.

DESCRIPTION OF EMBODIMENT

Hereinafter, one exemplary embodiment of the present invention will be described with reference to the accompanying drawings.

First Exemplary Embodiment

Figure 1:
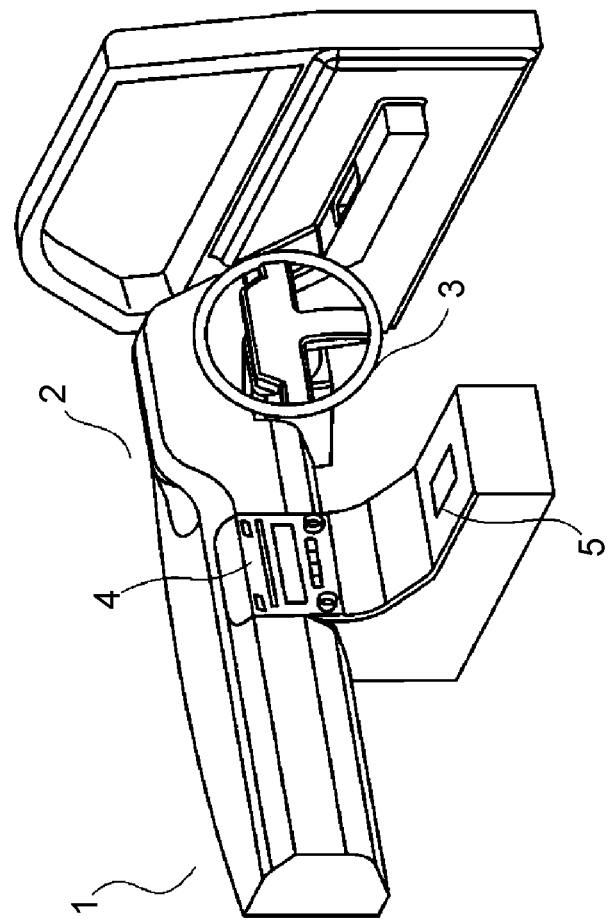
FIG. 1 is a perspective view showing a state where a mobile terminal charger of one exemplary embodiment of the present invention is installed in an interior of a vehicle.

In FIG. 1, handle 3 is installed in a front portion of interior 2 of vehicle 1.

Moreover, electronic device 4 that reproduces music and video, and displays car navigation video is installed at the side of handle 3.

Furthermore, mobile terminal charger 5 is installed at the rear of electronic device 4 in interior 2.

As shown in FIGS. 2 to 6, mobile terminal charger 5 includes box-shaped body case 7 with mobile terminal installation plate 6 disposed in an upper surface of body case 7, charging coil 8 provided movably in a horizontal direction in a state opposed to a lower surface side of mobile terminal installation plate 6, driving means 9 for moving charging coil 8 in the horizontal direction in opposition to the lower surface side of mobile terminal installation plate 6, and control means (10 in FIG. 9) connected to driving means 9 and charging coil 8. Charging coil 8, driving means 9, and control means 10 are provided in body case 7.

Hereinafter, the respective parts will be described.

First, mobile terminal installation plate 6 will be described.

Figure 6:
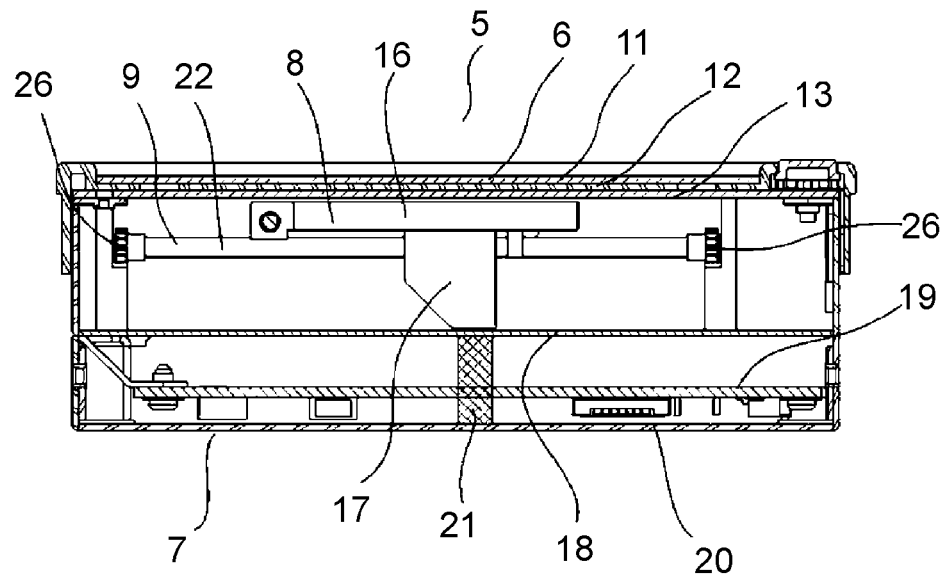
FIG. 6 is a partially notching perspective view of the same.

Mobile terminal installation plate 6 is formed so as to superimpose front surface plate 11, intermediate plate 12, and back surface plate 13, as shown in FIG. 6.

Moreover, front surface plate 11 and back surface plate 13 are formed of a synthetic resin, and further, intermediate plate 12 is formed of ceramic. That is, a configuration is such that a magnetic flux from charging coil 8 can pass through mobile terminal installation plate 6 in a direction of mobile terminal 15.

Figure 9:
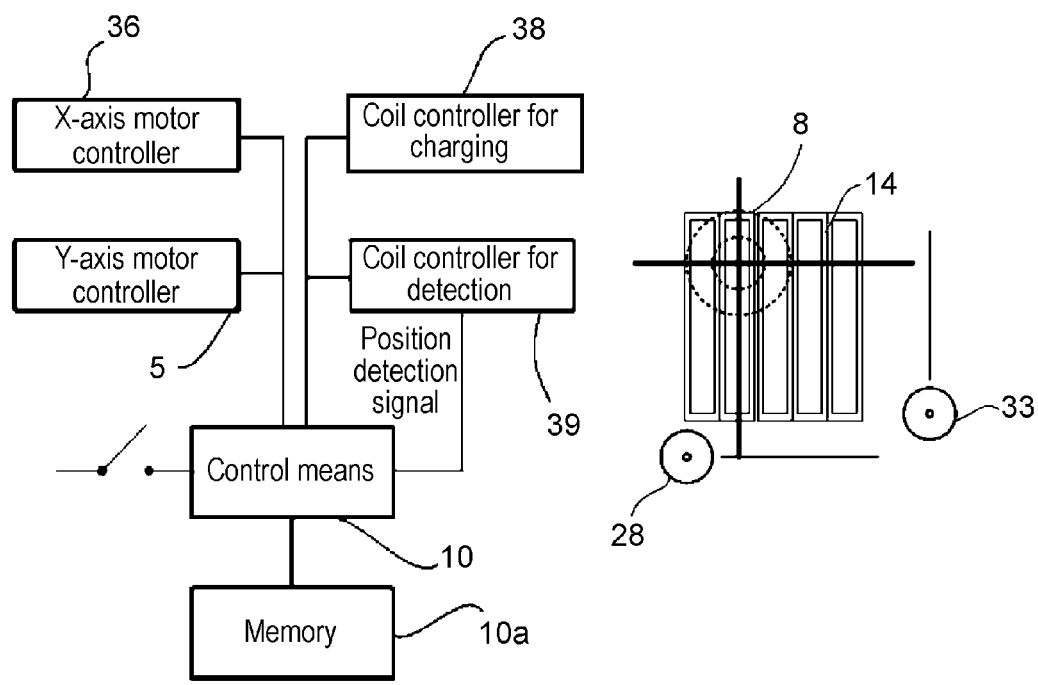
FIG. 9 is a control block diagram of the same.

Moreover, in a front surface of intermediate plate 12, position detection coil 14 in FIG. 9 is provided.

Figure 3:
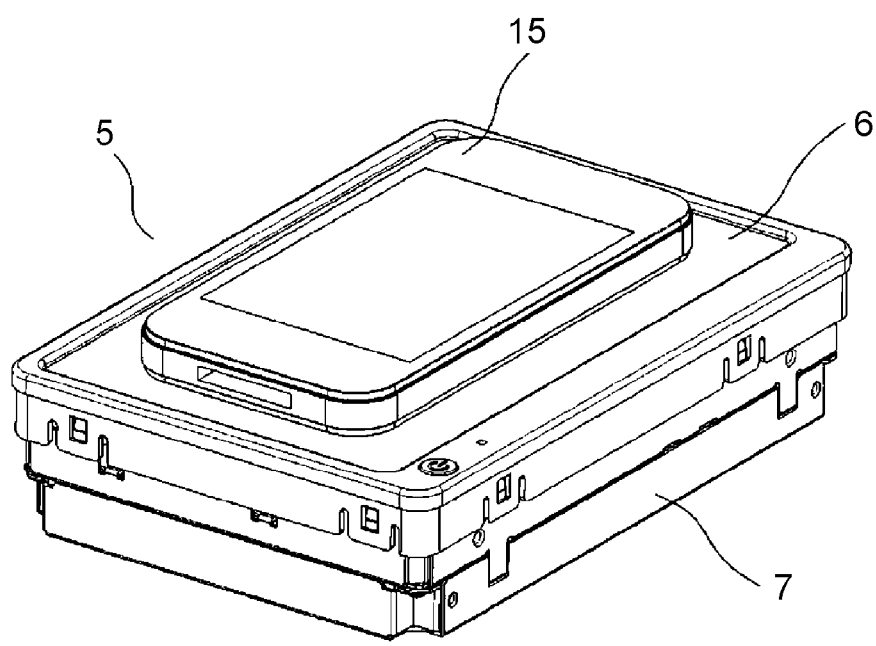
FIG. 3 is a perspective view of the same.

Position detection coil 14 is that used in PTL 1 (Unexamined Japanese Patent Publication No. 2009-247194), and detects at which position on the upper surface of mobile terminal installation plate 6 mobile terminal 15 is placed as shown in FIG. 3.

In the present exemplary embodiment, a configuration is such that using position detection coil 14, at which position on the upper surface of mobile terminal installation plate 6 mobile terminal 15 is placed as shown in FIG. 3 is detected, and next, charging coil 8 is moved to a position of a charging coil (not shown) of mobile terminal 15.

Next, charging coil 8 will be described.

Figure 4:
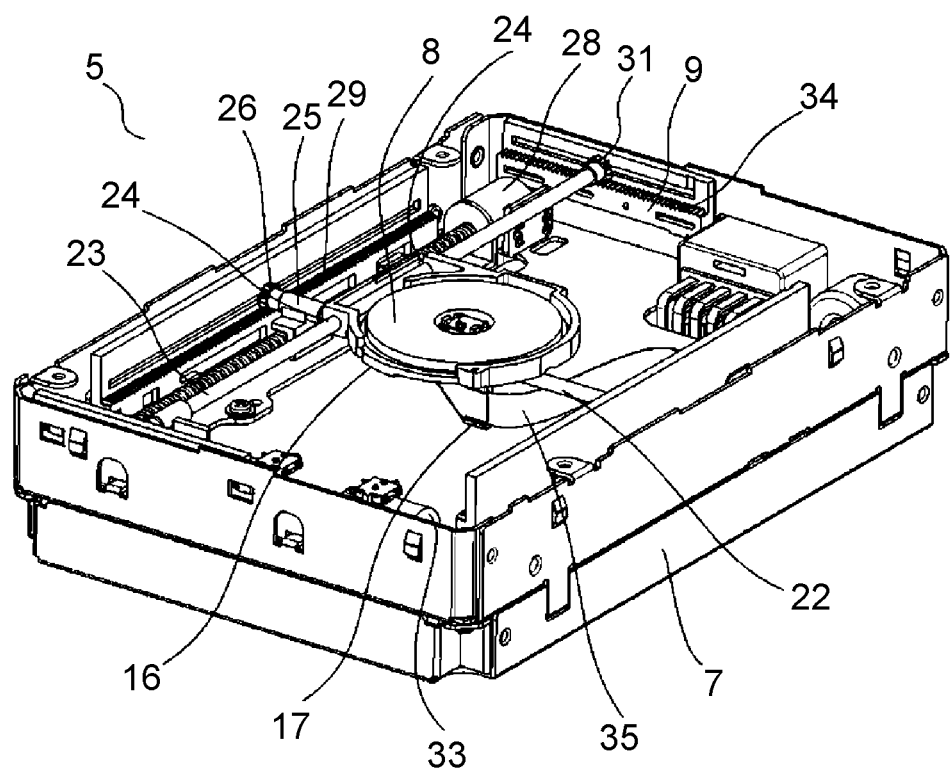
FIG. 4 is a perspective view showing a state where a part of the same is removed.
Figure 5:
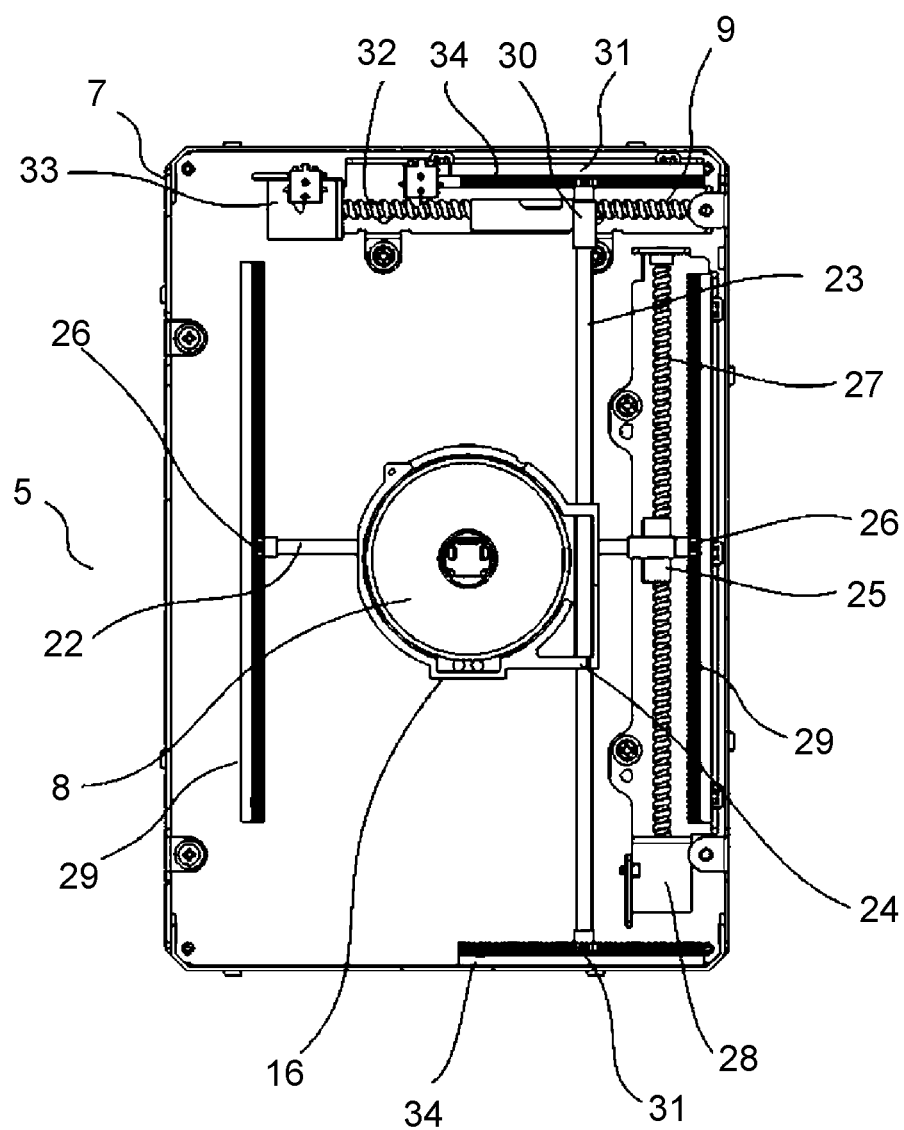
FIG. 5 is a plan view showing the state where the part of the same is removed.

As understood from FIG. 4, FIG. 5, charging coil 8 is formed of annularly winding a lead wire a plurality of times, and an outer circumferential side and a lower surface side of charging coil 8 are held in a state covered with holding body 16 made of a synthetic resin.

Moreover, in a lower surface of holding body 16, supporting leg 17 extended downward under charging coil 8 is integrally formed of the synthetic resin, as shown in FIG. 6.

Moreover, a gap of 0.3 millimeters is provided between a lower surface of supporting leg 17 and an upper surface of supporting plate 18 made of metal and disposed under supporting leg 17, and thus, in a normal state, the lower surface of supporting leg 17 does not come into contact with the upper surface of supporting plate 18 during movement of charging coil 8.

In the above configuration, in the present exemplary embodiment, supporting leg 17 is provided under charging coil 8.

Control board 19 and lower surface plate 20 of body case 7 are disposed under supporting plate 18, and supporting body 21 penetrating control board 19 is provided between a lower surface of supporting plate 18 and an upper surface of lower surface plate 20.

Next, driving means 9 will be described.

As shown in FIG. 4, FIG. 5, driving means 9 has X-axis direction driving shaft 22 and Y-axis direction driving shaft 23. Respective intermediate portions of X-axis direction driving shaft 22 and Y-axis direction driving shaft 23 are engaged with holding body 16 in portions other than a charging coil holding portion of holding body 16.

That is, in holding body 16, through-holes (not shown) that X-axis direction driving shaft 22 goes through and through-holes 24 that Y-axis direction driving shaft 23 goes through are provided at a predetermined vertical distance from each other in a crossed state, and X-axis direction driving shaft 22 and Y-axis direction driving shaft 23 go through the through-holes, which brings about an engaged state.

Moreover, worm wheel 25 is provided on one end side of X-axis direction driving shaft 22, and at one end, gear 26 is provided, and at another end as well, gear 26 is provided.

Worm wheel 25 is engaged with worm 27, and worm 27 is coupled to motor 28.

Moreover, gears 26 on both sides are engaged with gear plates 29.

Thus, when motor 28 is driven, worm 27 rotates, which moves worm wheel 25 in an X axis direction together with X-axis direction driving shaft 22, so that charging coil 8 moves in the X axis direction.

Moreover, worm wheel 30 is provided at one end side of Y-axis direction driving shaft 23, at one end, gear 31 is provided, and at another end as well, gear 31 is provided.

Worm wheel 30 is engaged with worm 32, and worm 32 is coupled to motor 33.

Moreover, gears 31 on both sides are engaged with gear plates 34.

Thus, when motor 33 is driven, worm 32 rotates, which moves worm wheel 30 in a Y axis direction together with Y-axis direction driving shaft 23, so that charging coil 8 moves in the Y axis direction.

Reference numeral 35 shown in FIG. 4 denotes flexible wiring for energizing charging coil 8, and an end portion of flexible wiring 35 is fixed to a side surface of above-described supporting leg 17.

Moreover, as shown in FIG. 9, to control means 10 is connected motor 28 through X-axis motor controller 36, and is connected motor 33 through Y-axis motor controller 37.

Moreover, to control means 10 is connected charging coil 8 through charging coil controller 38, and further, to control means 10 is connected position detection coil 14 through coil controller for detection 39.

In the above-described configuration, in the present exemplary embodiment, when power switch 40 is turned OFF (S1 in FIG. 10), charging coil 8 is moved to a center of body case 7 (hereinafter, referred to as point A) as shown in FIGS. 4 to 6 (S2 in FIG. 10), and the power is put into an OFF state (S3 in FIG. 10).

Figure 2:
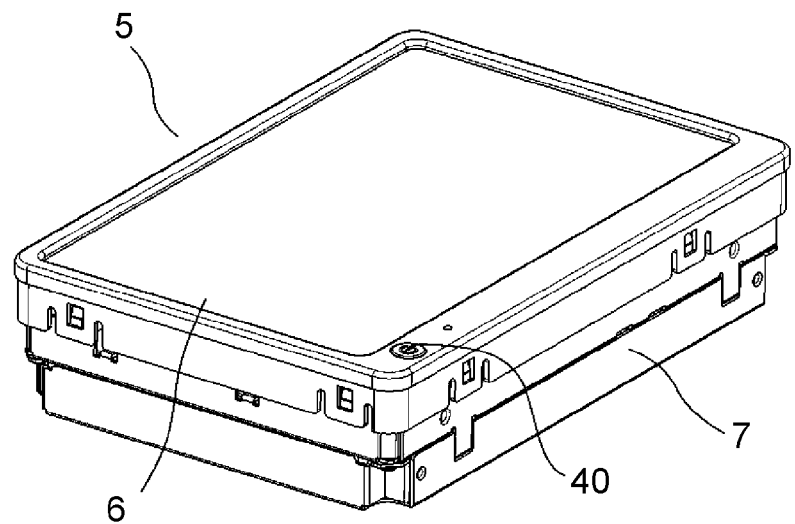
FIG. 2 is a perspective view of the mobile terminal charger.

That is, as shown in FIG. 2, in a state where mobile terminal 15 is not placed on mobile terminal installation plate 6 of body case 7, mobile terminal installation plate 6 is in a state exposed to interior 2, as shown in FIG. 1.

This may cause a situation where a hand is placed on mobile terminal installation plate 6 by mistake, and at this time, mobile terminal installation plate 6 is in an overloaded state.

Consequently, in the present exemplary embodiment, charging coil 8 is moved to the center of body case 7, so that the above-described overload is supported by charging coil 8, holding body 16, supporting leg 17, and supporting plate 18, as shown in FIGS. 4 to 6.

That is, in the state where mobile terminal installation plate 6 is overloaded in this manner, mobile terminal installation plate 6 is slightly bent downward, and in this state, charging coil 8, holding body 16, and supporting leg 17 also move downward, which makes the lower surface of supporting leg 17 abut on the upper surface of supporting plate 18.

As a result, the above-described overload is supported by supporting plate 18 through mobile terminal installation plate 6, charging coil 8, holding body 16, and supporting leg 17, which can suppress damage of mobile terminal installation plate 6 and charging coil 8.

In the present exemplary embodiment, the configuration is such that in order to increase strength against the overload, a lower surface side of supporting plate 18 is supported by lower surface plate 20 of body case 7 through supporting body 21.

Moreover, when the above-described overload is removed, mobile terminal installation plate 6 elastically returns upward, and charging coil 8 and holding body 16 also return upward by elastic return of X-axis direction driving shaft 22 and Y-axis direction driving shaft 23, which puts the lower surface of supporting leg 17 into the state disposed with the gap above the upper surface of supporting plate 18.

Thus, the lower surface of supporting leg 17 does not become an obstacle during the subsequent movement of charging coil 8.

Moreover, at the time of charging of mobile terminal 15, power switch 40 is first turned ON (S4 in FIG. 10), and mobile terminal 15 is placed on the upper surface of mobile terminal installation plate 6.

Figure 10:
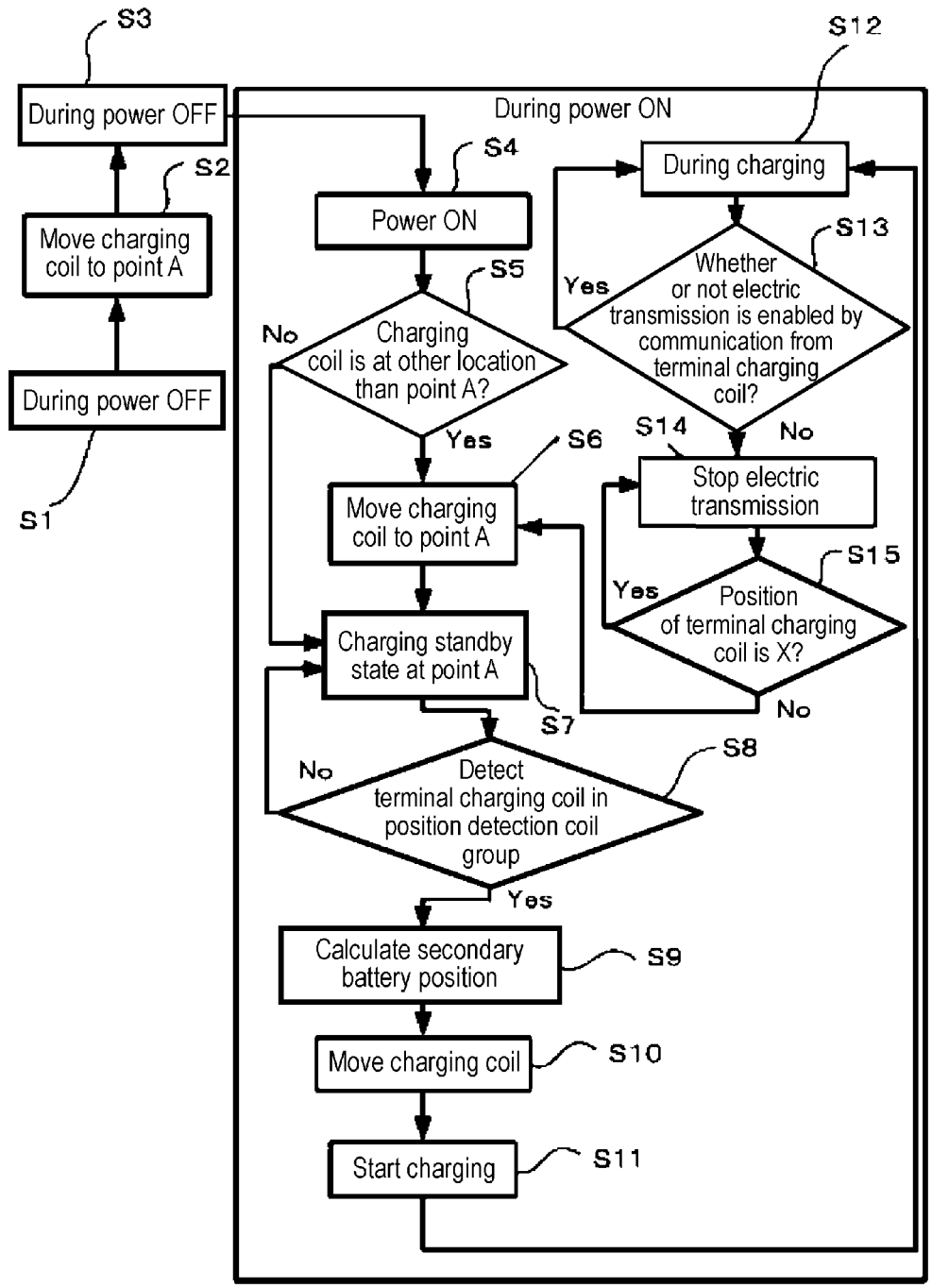
FIG. 10 is a flowchart of operation of the same.

In this state as well, in the present exemplary embodiment, first, it is checked whether or not charging coil 8 exists at point A by control means 10 (S5 in FIG. 10).

This check can be made from driving amounts of motors 28, 33 stored by X-axis motor controller 36 and Y-axis motor controller 37.

If it is determined that charging coil 8 does not exist at point A, charging coil 8 is moved to point A by control means 10 (S6 in FIG. 10) to be put into a charging standby state at point A (S7 in FIG. 10).

Next, using position detection coil 14, control means 10 detects at which position on the upper surface of mobile terminal installation plate 6 mobile terminal 15 is placed as shown in FIG. 3 (S8, S9 in FIG. 10).

A location where mobile terminal 15 is placed is actually a location of the mobile charging coil (15a in FIG. 16) incorporated in mobile terminal 15.

Thereafter, control means 10 drives motors 28, 33 through X-axis motor controller 36 and Y-axis motor controller 37 to move charging coil 8 to a detected position of the mobile charging coil (15a in FIG. 16) that mobile terminal 15 holds (S10 in FIG. 10), and then starts the charging through charging coil controller 38 (S11, S12 in FIG. 10).

Moreover, during this charging, by the same operation as that in PTL 1 (Unexamined Japanese Patent Publication No. 2009-247194), whether or not continuation of the charging is needed (whether or not the charging is completed) is determined (S13 in FIG. 10), and if the charging is completed (full charging), control means 10 ends the charging operation (S14 in FIG. 10).

Moreover, when the above-described charging operation is completed, whether or not charging coil 8 exists at point A is checked by control means 10 (S15 in FIG. 10), and then charging coil 8 is returned to point A (S6 in FIG. 10).

This check can be made from the driving amounts of motors 28, 33 stored by X-axis motor controller 36 and Y-axis motor controller 37.

Figure 7:
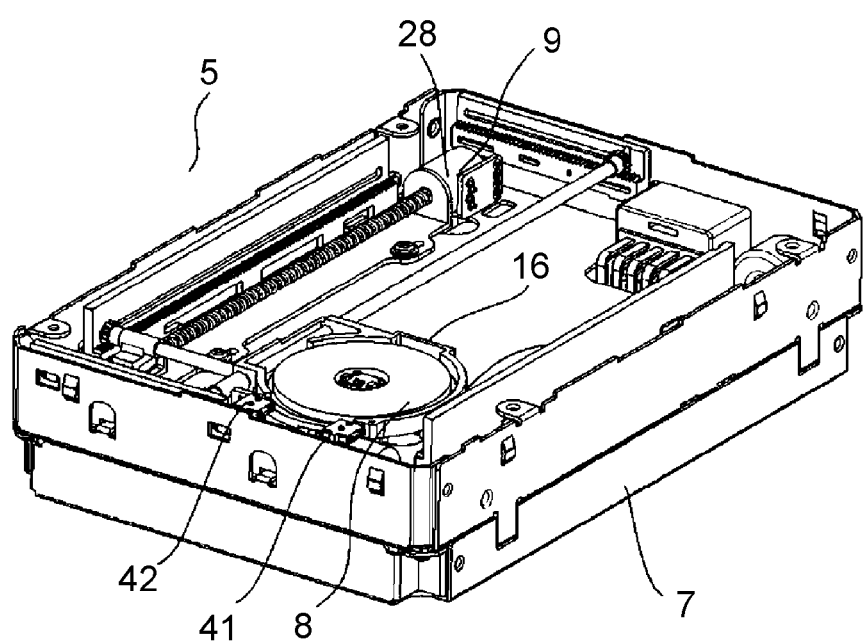
FIG. 7 is a perspective view showing a state where the part of the same is removed.
Figure 8:
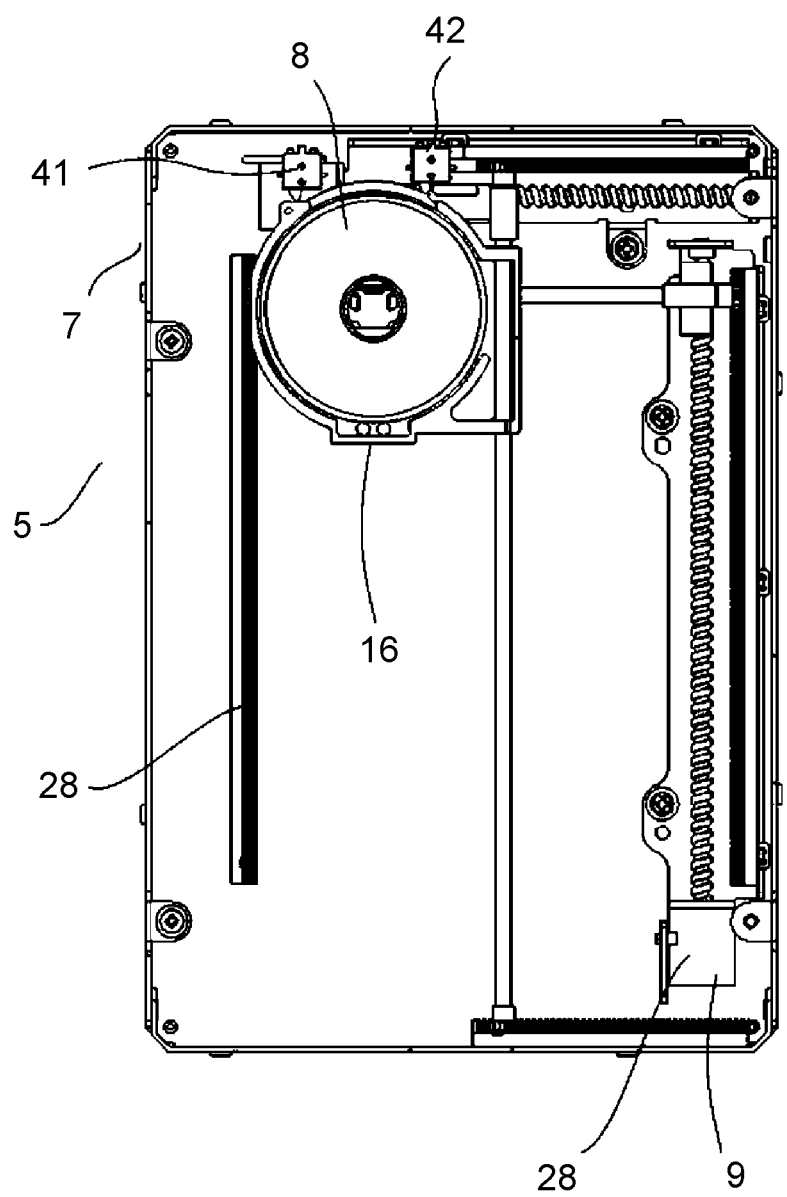
FIG. 8 is a plan view showing the state where the part of the same is removed.

If charging coil 8 cannot be returned to point A by control means 10, for example, if due to any impact in operation, a position calculated from the driving amounts of motors 28, 33 stored by X-axis motor controller 36 and Y-axis motor controller 37, and an actual position measured by position detection coil 14 are out of alignment, operation in FIG. 7, FIG. 8 is executed.

That is, motors 28, 33 are driven by control means 10 through X-axis motor controller 36 and Y-axis motor controller 37 to move charging coil 8 to a corner inside body case 7.

In this corner portion, switches 41, 42 exist, and when charging coil 8 moves to the corner inside body case 7, these switches 41, 42 operate, which allows control means 10 to determine that charging coil 8 has moved to an initial value.

In this state, the operation amounts of motors 28, 33 by X-axis motor controller 36 and Y-axis motor controller 37 are also initial values, and position control is performed again from here.

As described above, in the present exemplary embodiment, after the charging operation ends, charging coil 8 is returned to point A by control means 10, and this point will be described in more detail.

While in the foregoing, it has been described that point A is the central portion of body case 7, point A and position detection coil 14 may not be in the central portion of body case 7, as long as a relation described below is kept.

First, position detection coil 14 will be described.

Figure 11:
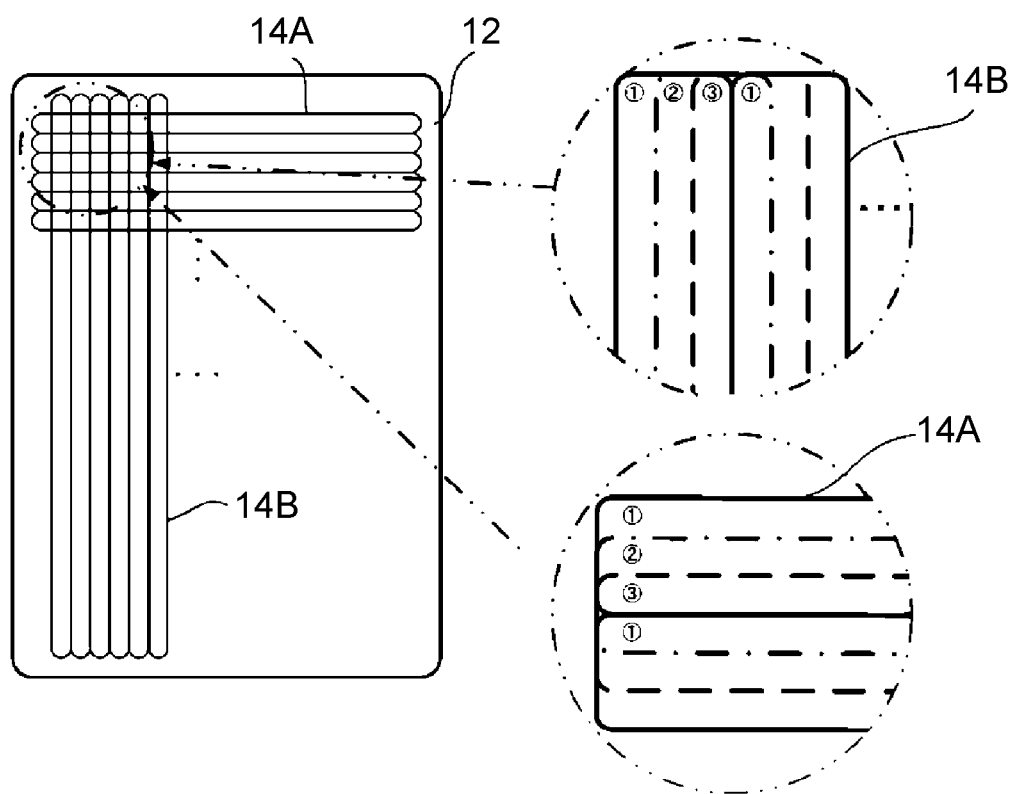
FIG. 11 is a view showing detection coils of the same.

Position detection coil 14 is provided in intermediate plate 12 made of ceramic and configuring mobile terminal installation plate 6, and particularly, as shown in FIG. 11, on a front surface side of intermediate plate 12, position detection coil 14A to detect a position in the X axis direction is provided, and on a back surface side of intermediate plate 12, position detection coil 14B to detect a position in the Y axis direction is provided.

Position detection coil 14A and position detection coil 14B are in a state crossing each other perpendicularly with intermediate plate 12 interposed, the intermediate plate being made of ceramic and configuring mobile terminal installation plate 6.

Figure 12:
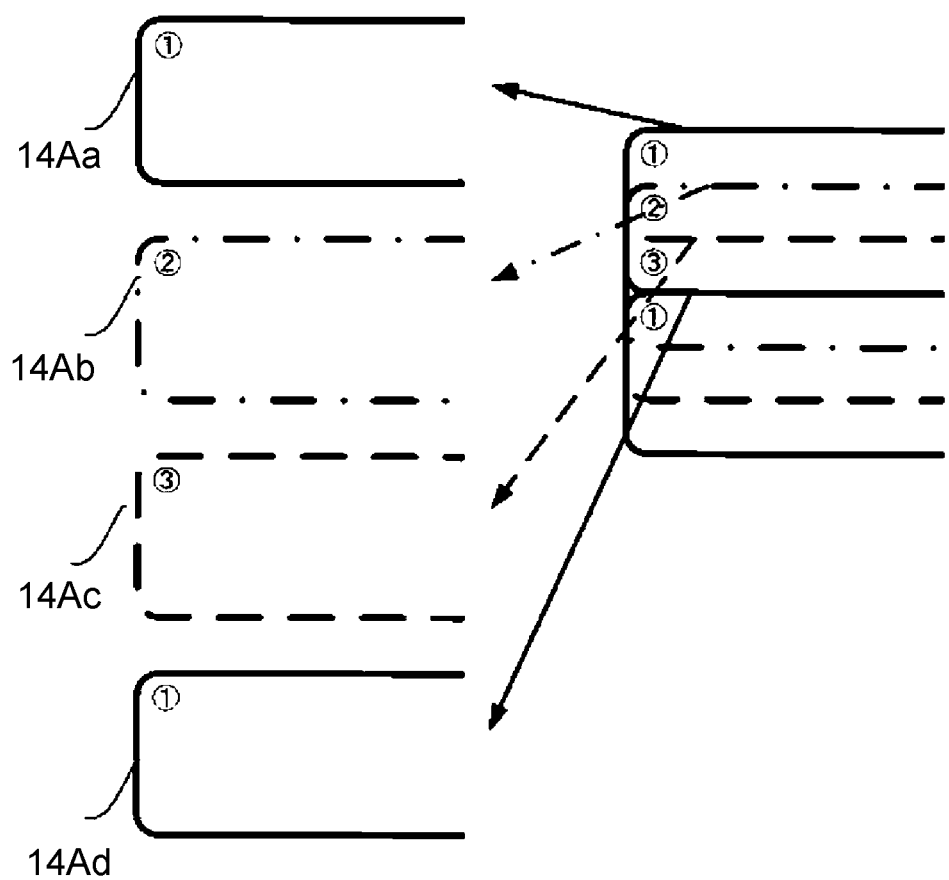
FIG. 12 is a view showing the detection coils of the same.

As understood from FIG. 11, FIG. 12, position detection coil 14A that detects the position in the X axis direction is formed by arranging a plurality of position detection coils 14Aa, 14Ab, 14Ac, 14Ad at predetermined intervals in a longitudinal direction of intermediate plate 12 made of ceramic and configuring mobile terminal installation plate 6.

As shown in FIG. 12, position detection coils 14Aa, 14Ab, 14Ac, 14Ad each have a rectangular loop shape, and are arranged in a state where they are displaced one by one by a dimension of ⅓ of each of position detection coils 14Aa, 14Ab, 14Ac, 14Ad in a short side direction.

Accordingly, a lower side of position detection coil 14Aa in FIG. 12 and an upper side of position detection coil 14Ad are in an overlapping state.

In the above-described state, the plurality of position detection coils 14Aa, 14Ab, 14Ac, 14Ad are arranged with regularity in the longitudinal direction of intermediate plate 12 made of ceramic and configuring mobile terminal installation plate 6.

Figure 13:
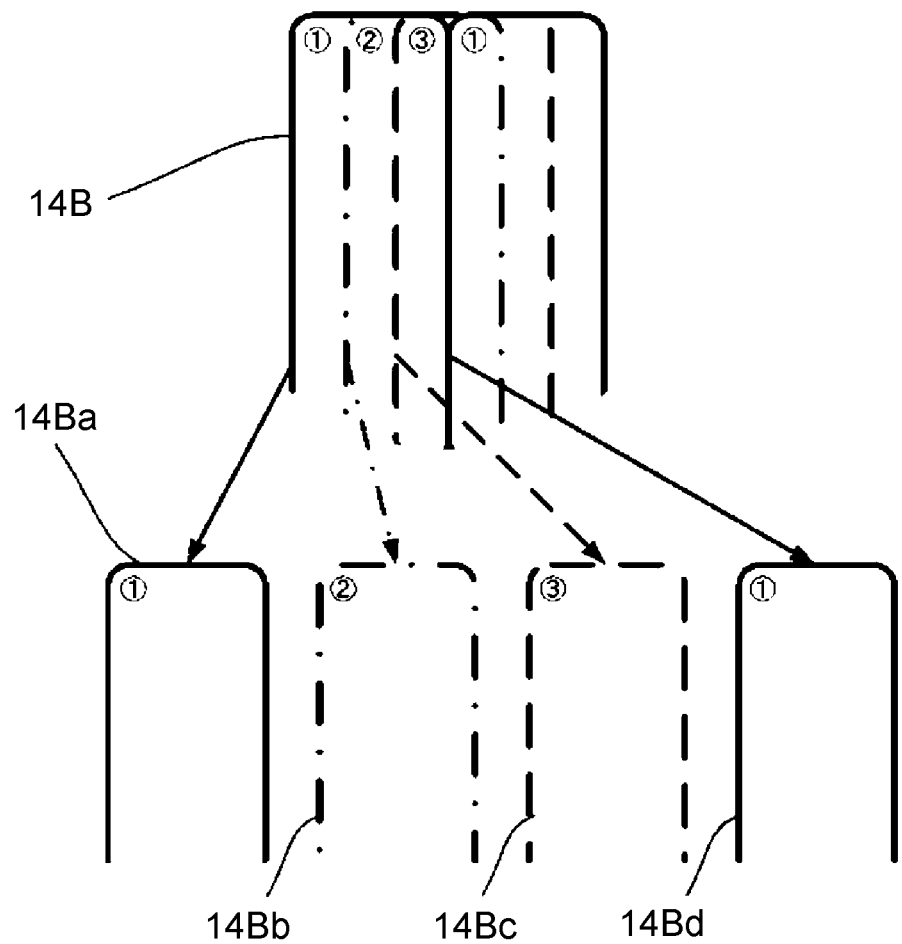
FIG. 13 is a view showing the detection coils of the same.

In contrast, as understood from FIG. 11, FIG. 13, position detection coil 14B that detects the position in the Y axis direction is formed by arranging a plurality of position detection coils 14Ba, 14Bb, 14Bc, 14Bd at predetermined intervals in a short direction of intermediate plate 12 made of ceramic and configuring mobile terminal installation plate 6.

As shown in FIG. 13, position detection coils 14Ba, 14Bb, 14Bc, 14Bd each have a rectangular loop shape and are arranged in a state where they are displaced one by one by a dimension of ⅓ of each of position detection coils 14Ba, 14Bb, 14Bc, 14Bd in a short side direction.

Accordingly, a right side of position detection coil 14Ba in FIG. 13 and a left side of position detection coil 14Bd are in an overlapping state.

In the above-described state, the plurality of position detection coils 14Ba, 14Bb, 14Bc, 14Bd are disposed with regularity in the short direction of intermediate plate 12 made of ceramic and configuring mobile terminal installation plate 6.

Figure 14:
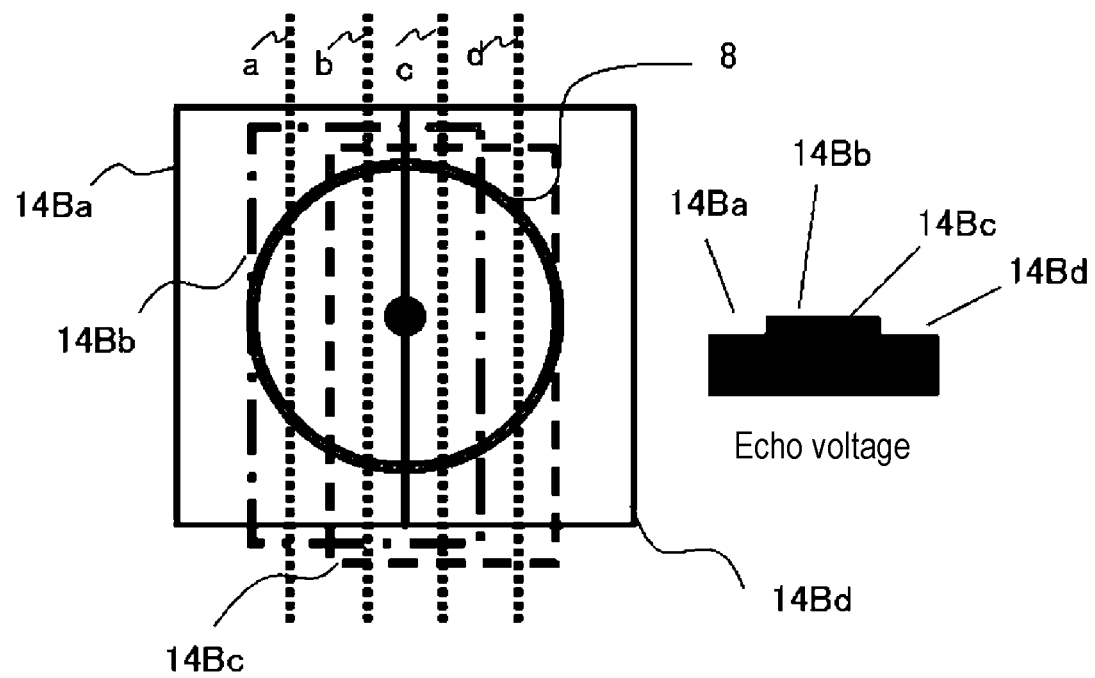
FIG. 14 is a view showing a relation between the detection coils and a charging coil of the mobile terminal charger of the one exemplary embodiment.

Referring to FIG. 14, a relation between position detection coils 14Ba, 14Bb, 14Bc, 14Bd and point A, which is the central portion of above-described body case 7, will be described.

While in FIG. 14, in order to distinguish position detection coils 14Ba, 14Bb, 14Bc, 14Bd from one another, they are also in a vertically displaced state, an actual state is as shown in FIG. 13.

In FIG. 14, "a" denotes a center line passing a center of a short side of position detection coil 14Ba, "b" denotes a center line passing a center of a short side of position detection coil 14Bb, "c" denotes a center line passing a center of a short side of position detection coil 14Bc, and "d" denotes a center line passing a center of a short side of position detection coil 14Bd.

An important thing is that as shown in FIG. 14, a central point of charging coil 8 in the standby state at point A does not overlap any of center lines a, b, c, d of position detection coils 14Ba, 14Bb, 14Bc, 14Bd.

That is, after the charging ends, the center of the charging coil 8 is moved to a portion not overlapping any of center lines a, b, c, d of position detection coils 14Ba, 14Bb, 14Bc, 14Bd (a portion deviated from center lines a, b, c, d of position detection coils 14Ba, 14Bb, 14Bc, 14Bd, and stands by at this position A (S2 or S7 in FIG. 10).

In the present exemplary embodiment, the detection as to whether or not mobile terminal 15 is placed on the upper surface of mobile terminal installation plate 6 (S8 in FIG. 10) is performed on the side of position detection coils 14Ba, 14Bb, 14Bc, 14Bd, and thus, the position not overlapping center lines a, b, c, d of position detection coils 14Ba, 14Bb, 14Bc, 14Bd is position A, which is a standby position of above-described charging coil 8.

Obviously, the detection as to whether or not mobile terminal 15 is placed on the upper surface of mobile terminal installation plate 6 (S8 in FIG. 10) may be performed on the side of position detection coils 14Aa, 14Ab, 14Ac, 14Ad, and in this case, a position not overlapping center lines a, b, c, d of position detection coils 14Aa, 14Ab, 14Ac, 14Ad is position A, which is the standby position of above-described charging coil 8.

Based on the above-described configuration, the operation will be described in more detail. In order to charge mobile terminal 15, when power switch 40 is turned ON (S4 in FIG. 10), as described above, a check as to whether or not charging coil 8 exists at point A is made by control means 10 (S5 in FIG. 10, FIG. 15).

This check can be made from the driving amounts of motors 28, 33 stored by X-axis motor controller 36 and Y-axis motor controller 37.

Figure 15:
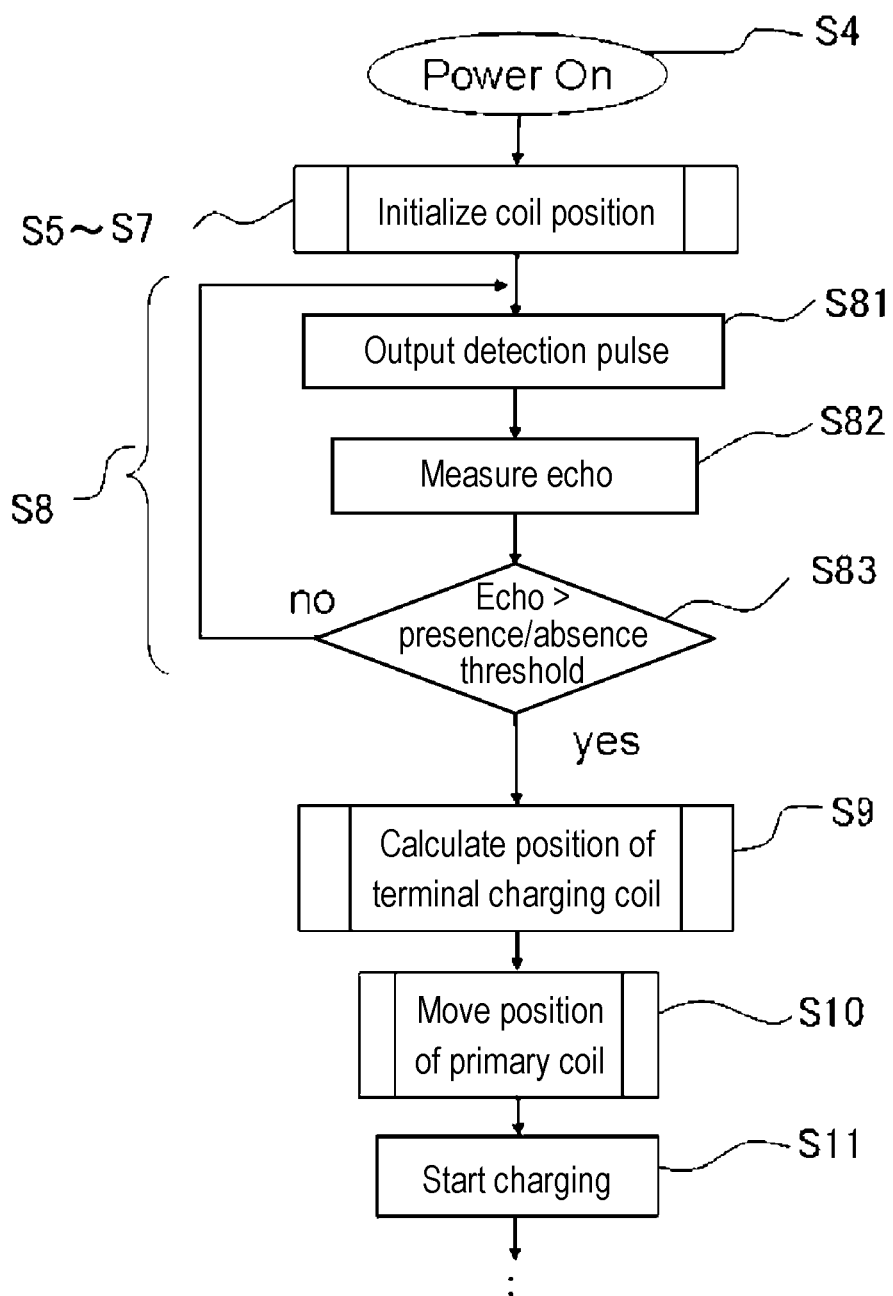
FIG. 15 is a flowchart of operation of the mobile terminal charger.

If it is determined that charging coil 8 does not exist at point A, charging coil 8 is moved to point A by control means 10 (S6 in FIG. 10, FIG. 15) to put into the standby state at this point A (S7 in FIG. 10, FIG. 15).

Next, using position detection coil 14, control means 10 detects at which position on the upper surface of mobile terminal installation plate 6 mobile terminal 15 is placed as shown in FIG. 3 (S8, S9 in FIG. 10, FIG. 15).

The location where mobile terminal 15 is placed is actually the location of the mobile charging coil (15a in FIG. 16) incorporated in mobile terminal 15.

This point will be described in detail with reference to FIG. 14, FIG. 15. When using position detection coil 14, it is detected at which position on the upper surface of mobile terminal installation plate 6 mobile terminal 15 is placed as shown in FIG. 3, a pulse signal of 1 MHz is sequentially supplied to position detection coils 14Ba, 14Bb, 14Bc, 14Bd from coil controller for detection 39 in FIG. 9 (S81 in FIG. 15), and at this time, control means 10 determines at which position on the upper surface of mobile terminal installation plate 6 mobile terminal 15 is placed as shown in FIG. 3, based on whether or not an echo signal from the mobile charging coil (15a in FIG. 16) of mobile terminal 15 is present (S82, S83 in FIG. 15).

The echo signals captured in position detection coils 14Ba, 14Bb, 14Bc, 14Bd at this time are temporarily stored in memory 10a in FIG. 9.

As known well, the mobile charging coil (15a in FIG. 16) of mobile terminal 15 resonates at 1 MHz before the charging. When the pulse signal of 1 MHz is sequentially output to above-described position detection coils 14Ba, 14Bb, 14Bc, 14Bd, the larger echo signal is emitted from mobile charging coil 15a. Position detection coils 14Ba, 14Bb, 14Bc, 14Bd capture the echo signal, by which it is detected that mobile terminal 15 is placed as shown in FIG. 3 at some position on the upper surface of mobile terminal installation plate 6.

Figure 16:
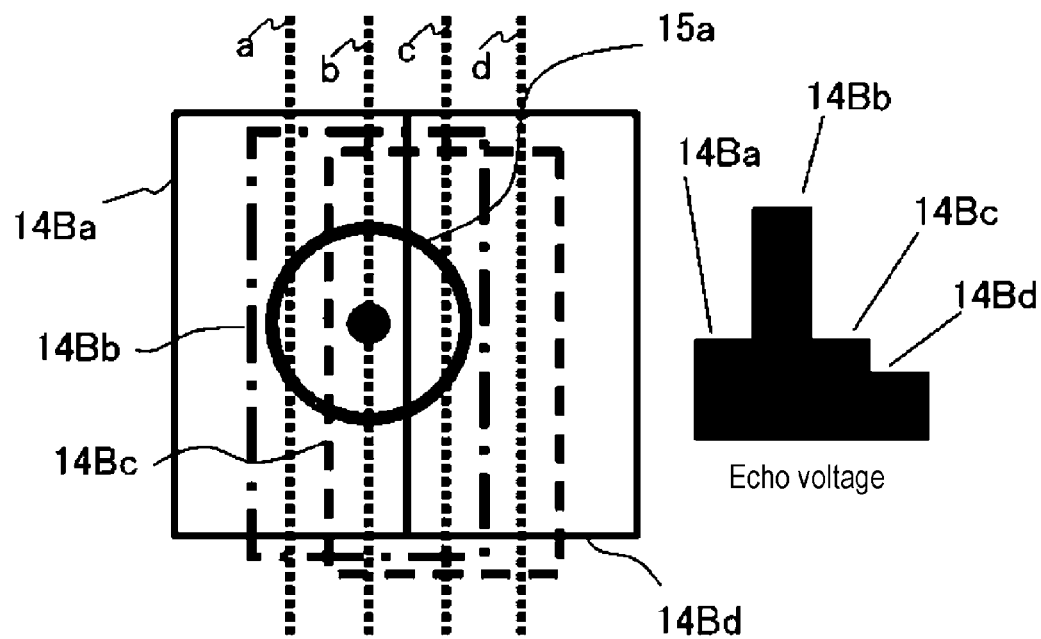
FIG. 16 is a view showing a relation between the detection coils and the charging coil of the same.

FIG. 16 shows a state where mobile charging coil 15a of mobile terminal 15 is placed on center line b of position detection coil 14Bb in the upper surface of mobile terminal installation plate 6, and it can be seen that of the echo signals captured in position detection coils 14Ba, 14Bb, 14Bc, 14Bd, the echo signal of position detection coil 14Bb is the largest.

Figure 17:
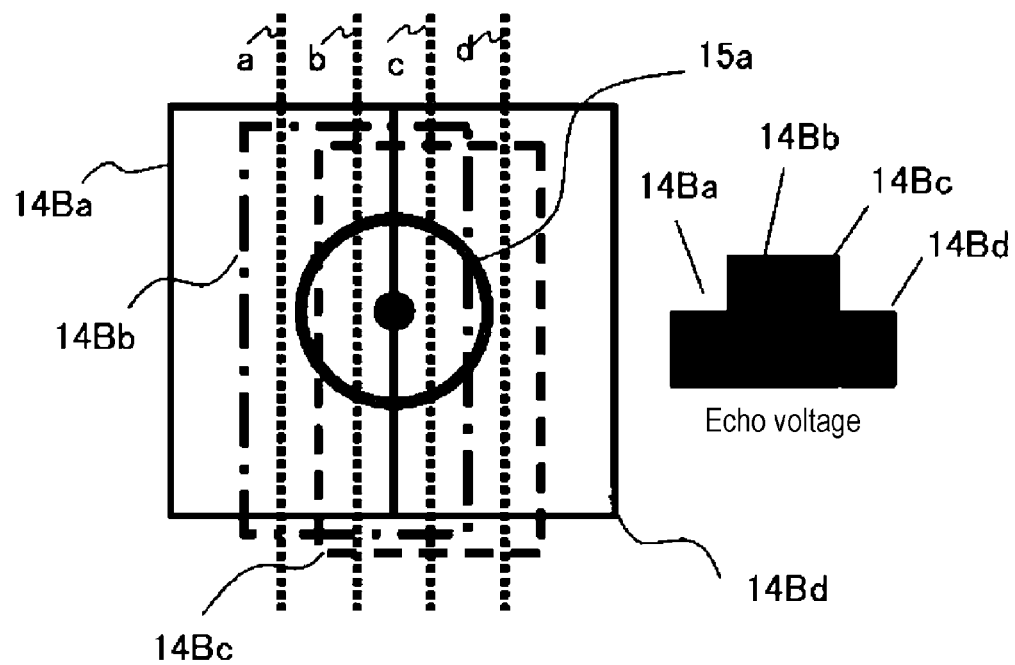
FIG. 17 is a view showing a relation between the detection coils and the charging coil of the same.

In contrast, FIG. 17 shows a state where mobile charging coil 15a of mobile terminal 15 is placed between center lines b, c of position detection coils 14Bb, 14Bc on the upper surface of mobile terminal installation plate 6, and of the echo signals captured in position detection coils 14Ba, 14Bb, 14Bc, 14Bd, the echo signals of position detection coils 14Bb, 14Bc are larger than the echo signals of position detection coils 14Ba, 14Bd, but are smaller than the echo signal in FIG. 16.

Moreover, in some types or some states of mobile terminal 15 (e.g., there is a cover on a back surface side or a seal is stuck to the back surface side), the echo signal from mobile charging coil 15a of mobile terminal 15 may become small as in FIG. 17, and thus, a determination level of the echo signal is lowered so that even in the above-described mobile terminal, it can be detected at which position on the upper surface of mobile terminal installation plate 6 mobile terminal 15 is placed as shown in FIG. 3.

However, when the determination level of the echo signal is lowered as described above, there is a possibility that an echo signal from charging coil 8 causes a malfunction.

Figure 18:
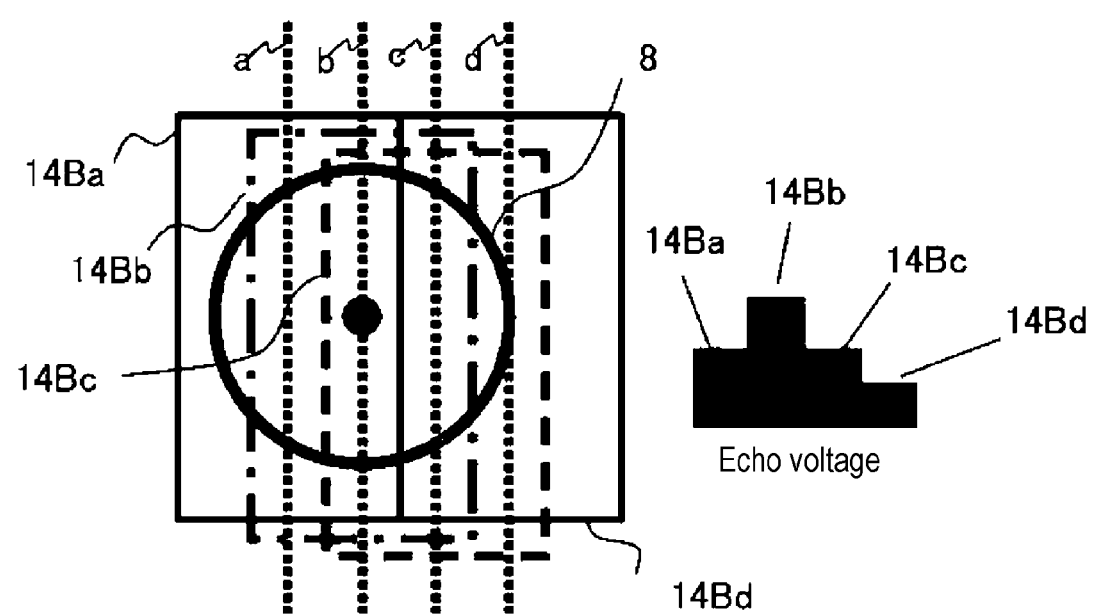
FIG. 18 is a view showing a relation between the detection coils and the charging coil of the same.

FIG. 18 shows a case where standby position point A of charging coil 8 is, for example, under center line b of position detection coil 14Bb, and it can be seen that at this time, when the echo signal from charging coil 8 is captured in position detection coils 14Ba, 14Bb, 14Bc, 14Bd, the echo signal of position detection coil 14Bb is the largest, and that the level of the echo signal is high.

In the above-described state, it cannot be determined whether the echo signals captured in position detection coils 14Ba, 14Bb, 14Bc, 14Bd are generated by mobile charging coil 15a or by charging coil 8, and as a result, there is a possibility that the malfunction will occur in subsequent operation.

That is, as described above, in some positions on the upper surface of mobile terminal installation plate 6 where mobile terminal 15 is placed, in some types, or in some states (e.g., there is a cover on the back surface side, or a seal is stuck to the back surface side), the echo signal from mobile charging coil 15a of mobile terminal 15 becomes small as shown in FIG. 17, and thus, the determination level of the echo signal is lowered so that even in the above-described mobile terminal, it can be detected at which position on the upper surface of mobile terminal installation plate 6 mobile terminal 15 is placed as shown in FIG. 3.

However, when the determination level is lowered as described above, if the level of the echo signal from charging coil 8 becomes high as shown in FIG. 18, control means 10 determines that mobile terminal 15 is placed on the upper surface of mobile terminal installation plate 6 although mobile terminal 15 is not placed on the upper surface of mobile terminal installation plate 6, and executes the subsequent operation.

This is a cause of the malfunction, and consequently, in the present exemplary embodiment, in order to prevent this, as described above, position A where charging coil 8 stands by after the charging ends is set to the position not overlapping any of center lines a, b, c, d of position detection coils 14Ba, 14Bb, 14Bc, 14Bd (the position deviated from center lines a, b, c, d of position detection coils 14Ba, 14Bb, 14Bc, 14Bd).

As a result, the echo signal from charging coil 8 can be made smaller than the echo signal captured in any of position detection coils 14Ba, 14Bb, 14Bc, 14Bd (sufficiently smaller than that in FIG. 17) as shown in FIG. 14.

Accordingly, the determination as to whether or not mobile terminal 15 is placed on the upper surface of mobile terminal installation plate 6 is not mistaken, and a subsequent malfunction is prevented.

After in this manner, it is determined that mobile terminal 15 is placed on the upper surface of mobile terminal installation plate 6, control means 10 operates coil controller for detection 39 to supply the pulse signal to position detection coils 14Aa, 14Ab, 14Ac, 14Ad, position detection coils 14Ba, 14Bb, 14Bc, 14Bd to specify mobile charging coil 15a of mobile terminal 15 (S9 in FIG. 15).

When coil controller for detection 39 specifies the position of mobile charging coil 15a of mobile terminal 15, control means 10 drives motors 28, 33 through X-axis motor controller 36 and Y-axis motor controller 37 to move charging coil 8 to the detected position of mobile charging coil 15a that mobile terminal 15 holds (S10 in FIG. 10, FIG. 15), and then starts the charging through charging coil controller 38 (S11, S12 in FIG. 10).

That is, it is preferable that after coil controller for detection 39 specifies the position of mobile charging coil 15a, control means 10 moves charging coil 8. This is because if charging coil 8 is in a location other than position A as the standby position, coil controller for detection 39 cannot detect the position of mobile charging coil 15a accurately.

Next, a greatest characteristic in the present exemplary embodiment will be described with reference to FIGS. 19 to 21.

The greatest characteristic of the present exemplary embodiment is a configuration in which the position of mobile terminal 15 on the upper surface of mobile terminal installation plate 6 is detected a plurality of times by position detection coil 14 used as detection means, and if the previous detected position and the subsequent (referred to as the next) detected position are the same, charging coil 8 is moved by motors 28, 33 used as the driving means to the charging position opposed to the previous detected position or the next detected position detected by position detection coil 14, and the charging is then started.

Position detection coil 14 of the present exemplary embodiment is adapted to be able to detect the presence or absence of mobile terminal 15 when mobile terminal 15 approaches the upper surface of mobile terminal installation plate 6 or is placed on the upper surface of mobile terminal installation plate 6, as described above (S1 in FIG. 19).

That is, in the present exemplary embodiment, as described above, the mobile charging coil (15a in FIG. 16) of mobile terminal 15 resonates at 1 MHz before the charging, as known well. When the pulse signal of 1 MHz is sequentially output to above-described position detection coils 14Ba, 14Bb, 14Bc, 14Bd, mobile charging coil 15a emits the large echo signal. Position detection coils 14Ba, 14Bb, 14Bc, 14Bd capture the echo signal, by which it is detected at which position on the upper surface of mobile terminal installation plate 6 mobile terminal 15 is placed as shown in FIG. 3.

Figure 20:
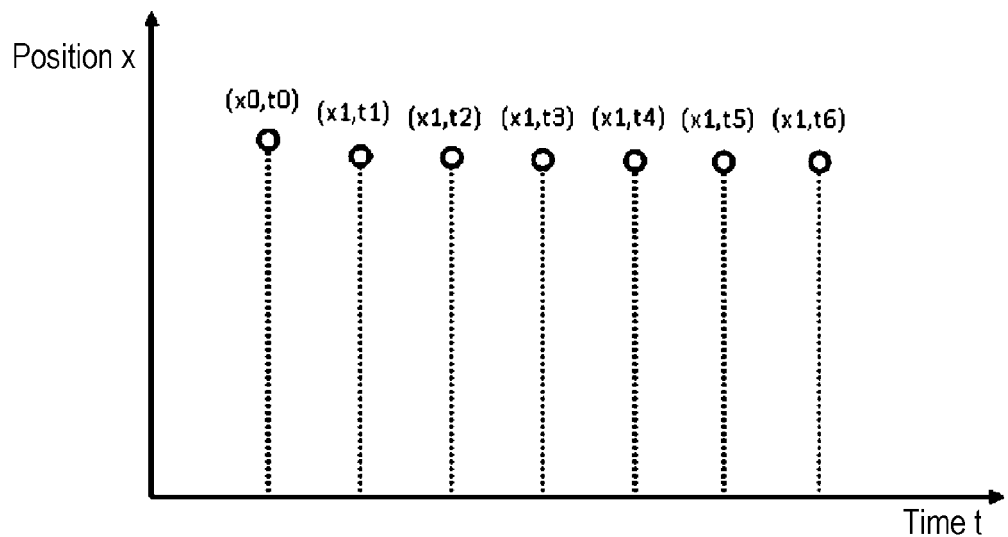
FIG. 20 is a diagram showing a state where mobile terminal is placed on the upper surface of mobile terminal installation plate in a normal state.
Figure 21:
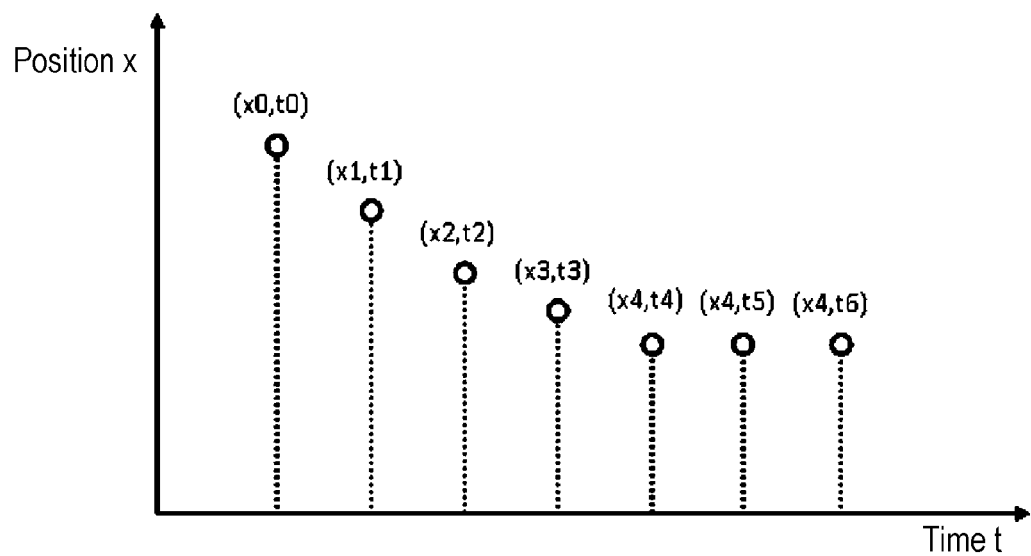
FIG. 21 is a diagram showing a state when mobile terminal approaches the upper surface of mobile terminal installation plate.

FIG. 20, FIG. 21 show the state where mobile terminal 15 is detected by position detection coil 14.

FIG. 20 shows a state where mobile terminal 15 is placed on the upper surface of mobile terminal installation plate 6 in a normal state.

That is, at time (t0), mobile terminal 15 approaches the upper surface of mobile terminal installation plate 6, and mobile terminal 15 is detected at point (x0) by position detection coil 14, and then, at time (t1), mobile terminal 15 is placed at point (x1) on the upper surface of mobile terminal installation plate 6.

Accordingly, thereafter, even when a point where mobile terminal 15 is placed is detected by position detection coil 14 every predetermined time, the detected point remains point (x1).

That is, at time (t1), time (t2), time (t3), time (t4), time (t5), and time (t6), the detected point remains point (x1).

In contrast, FIG. 21 shows a state where while mobile terminal 15 is once placed on the upper surface of mobile terminal installation plate 6, thereafter, mobile terminal 15 is continuously moved, or mobile terminal 15 is moved in a state close to the upper surface of mobile terminal installation plate 6 in the situation where the operation of placing mobile terminal 15 on the upper surface of mobile terminal installation plate 6 is performed.

That is, at time (t0), mobile terminal 15 approaches the upper surface of mobile terminal installation plate 6, and mobile terminal 15 is detected at point (x0) by position detection coil 14, and thereafter, mobile terminal 15 is still continuously moving on the upper surface of mobile terminal installation plate 6.

Accordingly, thereafter, when the point where mobile terminal 15 is placed is detected by position detection coil 14 every predetermined time, the result is point (x1) at time (t1), point (x2) at time (t2), point (x3) at time (t3), point (x4) at time (t4), point (x4) at time (t5), and point (x4) at time (t6).

That is, FIG. 21 shows a situation where mobile terminal 15 is placed at point (x4) at time (t4).

In either of FIG. 20 and FIG. 21, if in the state where mobile terminal 15 is first detected by position detection coil 14, charging coil 8 is immediately moved to the location by motors 28, 33, and then the charging is started, the positions of mobile terminal 15 and charging coil 8 are consequently misaligned, which consequently disables efficient charging to be performed.

Thus, the present exemplary embodiment employs the configuration in which the position of mobile terminal 15 on the upper surface of mobile terminal installation plate 6 is detected a plurality of times by position detection coil 14 used as the detection means, and if the previous detected position and the subsequent (referred to as the next) detected position are the same, charging coil 8 is moved by motors 28, 33 used as the driving means to the charging position opposed to the previous detected position or the next detected position detected by position detection coil 14 and the charging is then started.

Figure 19:
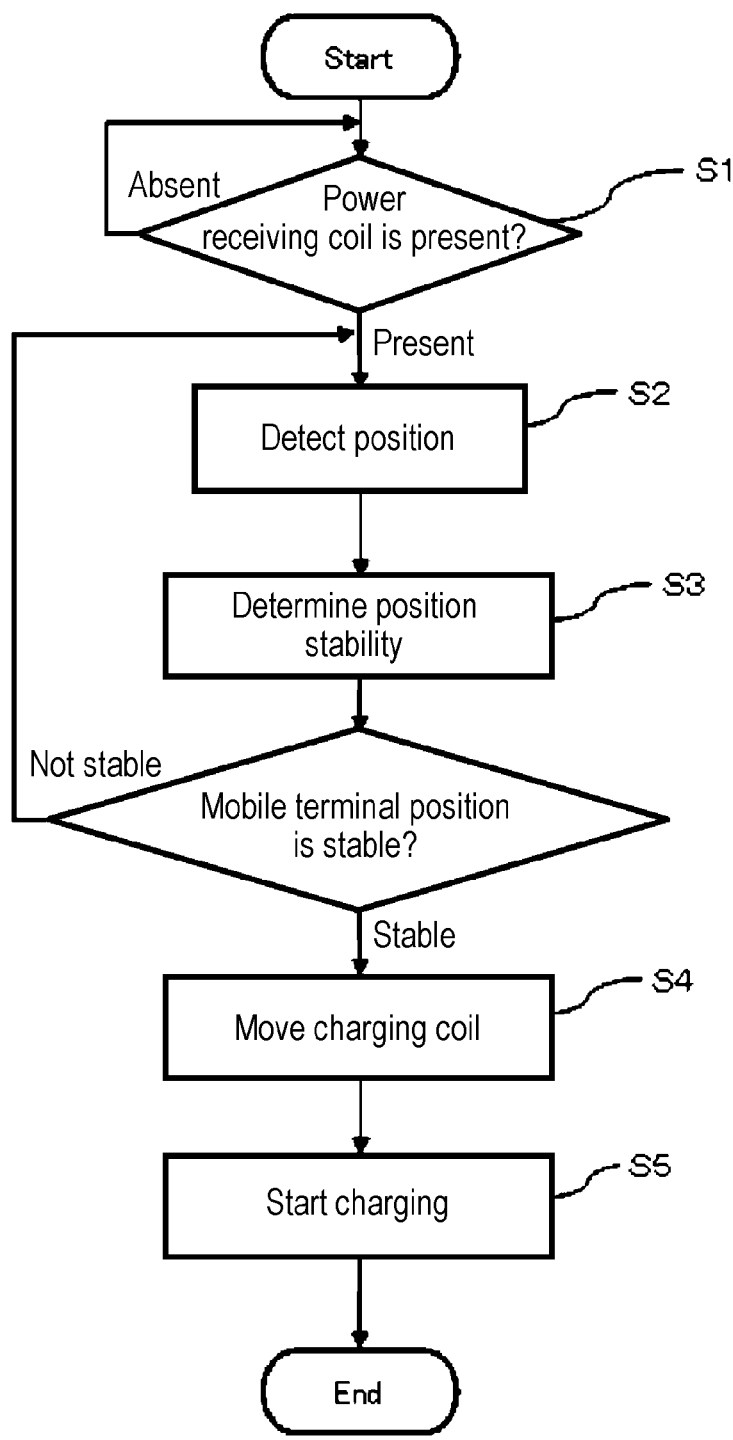
FIG. 19 is a flowchart of operation of the mobile terminal charger.

Specifically, in the case of FIG. 20, when mobile terminal 15 approaches the upper surface of mobile terminal installation plate 6 (t0 in FIG. 20), as described above, the presence or absence of mobile terminal 15 and the position detection are performed (S1, S2 in FIG. 19).

Next, control means 10 determines whether or not the previous detected position and the next detected position are the same (S3 in FIG. 19).

In FIG. 20, since at (t0), mobile terminal 15 is only detected at point (x0) by position detection coil 14, and there is no previous detected point, so that at this time, it is not determined that the position of mobile terminal 15 has become stable, and the processing returns to S2 again ("Not stable" in FIG. 19).

Next, the position detection is performed again at time (t1), and at this time, the position of (x1) is detected, and whether or not the previous detected position and the next detected position are the same is determined (S2, S3 in FIG. 19).

However, since at this time, the previous detected position is (x0), and the detected position this time is (x1), again, it is not determined that the position of mobile terminal 15 has become stable this time, and the processing returns to S2 again ("Not stable" in FIG. 19).

Next, the position detection is performed again at time (t2), and at this time, the position of (x1) is detected, and whether or not the previous detected position and the next detected position are the same is determined (S2, S3 in FIG. 19), again.

At this time, the previous detected position is (x1) and the detection position this time is also (x1), and thus, charging coil 8 is moved to detected position (x1) and the charging is started (S4, S5 in FIG. 19).

While in FIG. 20, thereafter, the position detection is continuously performed at (t2 to t6), the position detection may be ended at the time point when the charging starts.

In contrast, in the state of FIG. 21, when mobile terminal 15 approaches the upper surface of mobile terminal installation plate 6 (t0 in FIG. 21), as described above, the presence or absence of mobile terminal 15 and the position detection are performed (S1, S2 in FIG. 19).

Next, control means 10 determines whether or not the previous detected position and the next detected position are the same (S3 in FIG. 19).

In FIG. 21, since at (t0), mobile terminal 15 is only detected at point (x) by position detection coil 14, and there is no previous detected point, so that at this time, it is not determined that the position of mobile terminal 15 has become stable, and the processing returns to S2 again ("Not stable" in FIG. 19).

Next, the position detection is performed again at time (t1), and at this time, the position of (x1) is detected, and further whether or not the previous detected position and the next detected position are the same is again determined (S2, S3 in FIG. 19).

However, since at this time, the previous detected position is (x0), and the detected position this time is (x1), again, it is not determined that the position of mobile terminal 15 has become stable, and the processing returns to S2 again ("Not stable" in FIG. 19).

Next, the position detection is performed again at time (t2), and at this time, the position of (x2) is detected, and whether or not the previous detected position and the next detected position are the same is again determined (S2, S3 in FIG. 19).

However, since at this time, the previous detected position is (x2), and the detected position this time is (x1), again, it is not determined that the position of mobile terminal 15 has become stable, and the processing returns to S2 again ("Not stable" in FIG. 19).

Next, the position detection is performed again at time (t3), and at this time, the position of (x3) is detected, and whether or not the previous detected position and the next detected position are the same is again determined (S2, S3 in FIG. 19).

However, since at this time, the previous detected position is (x2), and the detected position this time is (x3), again, it is not determined that the position of mobile terminal 15 has become stable, and the processing returns to S2 again ("Not stable" in FIG. 19).

Next, the position detection is performed again at time (t4), and at this time, the position of (x4) is detected, and whether or not the previous detected position and the next detected position are the same is again determined (S2, S3 in FIG. 19).

However, since at this time, the previous detected position is (x3), and the detected position this time is (x4), again, it is not determined that the position of mobile terminal 15 has become stable, and the processing returns to S2 again ("Not stable" in FIG. 19).

Next, the position detection is performed again at time (t5), and at this time, the position of (x4) is detected, and whether or not the previous detected position and the next detected position are the same is again determined (S2, S3 in FIG. 19).

At this time, the previous detected position is (x4), and the detected position this time is also (x4), and thus, charging coil 8 is moved to detected position (x4), and the charging is started (S4, S5 in FIG. 19).

While in FIG. 21, thereafter, the position detection is continuously performed up to (t6), the position detection may be ended at the time point when the charging starts.

As described above, the present exemplary embodiment employs the configuration in which in control means 10, the position of mobile terminal 15 on the upper surface of mobile terminal installation plate 6 is detected a plurality of times by position detection coil 14 used as the detection means, and if the previous detected position and the subsequent (referred to as the next) detected position are the same, charging coil 8 is moved by motors 28, 33 used as the driving means to the charging position opposed to the previous detected position or the next detected position detected by position detection coil 14, and the charging is then started.

Thus, the charging is not performed in the state where the positions of mobile terminal 15 and charging coil 8 are out of alignment, which enables efficient charging to be performed.

As to the comparison of the positions, not only the comparison between the previous detected position and the detected position this time but also the comparison between the previous detected position and the detected position this time or the next detected position may be performed.

INDUSTRIAL APPLICABILITY

As described above, in the present invention, efficient charging can be performed.

Accordingly, the present invention is expected to be used for a vehicular or household mobile terminal charger.

The invention claimed is:

1. A mobile terminal charger comprising:
   a body case with a mobile terminal installation plate disposed in an upper surface of the body case;
   a detector that detects a position of a mobile terminal installed on an upper surface of the mobile terminal installation plate;
   a charging coil disposed movably and facing to a lower surface of the mobile terminal installation plate inside the body case;
   a driver that moves the charging coil facing to the lower surface of the mobile terminal installation plate; and
   a controller connected to the driver and the charging coil,
   wherein the controller causes the detector to detect the position of the mobile terminal on the upper surface of the mobile terminal installation plate a plurality of times, and causes the driver to move the charging coil to a charging position opposed to a previous detected position or a subsequent detected position detected by the detector when the previous detected position and the subsequent detected position are the same, and then starts the charging, and
   wherein the detector is formed of a plurality of detection coils, and the controller moves a central point of the charging coil to a standby position set to a portion deviated from respective central points of the plurality of detection coils when the charging of the mobile terminal by the charging coil ends, or when the charging is interrupted.

2. The mobile terminal charger according to claim 1, wherein a supporting leg is provided under the charging coil, and a gap is provided between a lower surface of the supporting leg and an upper surface of a supporting plate disposed under the supporting leg.

3. The mobile terminal charger according to claim 1, wherein the controller moves the charging coil from the standby position after the detector specifies the position of the mobile terminal.

4. A vehicle in which the mobile terminal charger according to claim 1 is disposed in an interior of the vehicle.

5. The mobile terminal charger according to claim 1, wherein when the previous detected position and the subsequent detected position are different, the position of the mobile terminal is again detected.

* * * * *